United States Patent [19]
Chefalo et al.

[11] Patent Number: 5,364,500
[45] Date of Patent: Nov. 15, 1994

[54] PROCESS FOR REMOVING NITRITES FROM A SILVER NITRATE SOLUTION

[75] Inventors: Patrick M. Chefalo, Rochester; Andrius A. Naujokas, Webster; Stephen M. Popham, Rochester; Gary M. DiStefano, Greece; Robert J. Buesing, Rochester, all of N.Y.

[73] Assignee: Eastman Kodak Company, Rochester, N.Y.

[21] Appl. No.: 180,944

[22] Filed: Jan. 12, 1994

Related U.S. Application Data

[63] Continuation-in-part of Ser. No. 821,666, Jan. 16, 1992, abandoned, which is a continuation-in-part of Ser. No. 650,145, Feb. 4, 1991, abandoned.

[51] Int. Cl.⁵ ............................................. B01D 1/14
[52] U.S. Cl. ................................. 159/49; 159/16.1; 203/89; 203/49; 423/395
[58] Field of Search ............... 159/47.1, 16.1, 49, 159/13.1; 203/49, 89; 202/158, 234; 423/390, 395, 405; 95/245

[56] References Cited

U.S. PATENT DOCUMENTS

| | | | |
|---|---|---|---|
| 1,039,325 | 9/1912 | Schonherr et al. | 423/393 |
| 1,581,519 | 1/1952 | Critchley | 23/102 |
| 2,185,580 | 1/1940 | Beekhuis, Jr. | 423/394 |
| 2,189,363 | 2/1990 | Kalous | 23/160 |
| 2,566,197 | 8/1951 | Hass et al. | 423/393 |
| 3,099,531 | 7/1963 | Boynton | 423/394 |
| 3,576,606 | 4/1971 | De Vry | 423/394 |
| 4,011,298 | 3/1977 | Fukui et al. | 423/393 |
| 4,031,187 | 6/1977 | Barba et al. | 423/394 |
| 4,062,928 | 12/1977 | Applegate et al. | 423/393 |
| 4,312,852 | 1/1982 | Dewey | 423/393 |
| 4,330,437 | 5/1982 | Krueger | 502/344 |
| 4,419,333 | 12/1983 | Reus et al. | 423/394 |
| 4,426,364 | 1/1984 | Cooper | 423/393 |
| 4,504,370 | 3/1985 | Lindner et al. | 204/129.75 |
| 4,603,036 | 7/1986 | Botton et al. | 423/394 |
| 4,874,485 | 10/1989 | Steele | 204/149 |
| 4,925,643 | 5/1990 | Steele | 423/394 |
| 5,000,928 | 3/1991 | White | 423/395 |

FOREIGN PATENT DOCUMENTS

| | | | |
|---|---|---|---|
| 60294 | 5/1977 | Japan. | |
| 8100397 | 2/1981 | WIPO | 423/393 |

OTHER PUBLICATIONS

*Perry's Chemical Engineer's Handbook*, 6th Ed., Section 18, "Liquid Gas Systems", Fair et al, Section 18, pp. 1–48, 1984.

*Primary Examiner*—Virginia Manoharan
*Attorney, Agent, or Firm*—Charles E. Snee, III

[57] ABSTRACT

A silver nitrate feed solution containing nitrites and nitric acid is treated to produce a low-nitrite silver nitrate product solution. In the process, the temperature of the feed solution is established in the range of from about 80° C. to about the boiling point of the feed solution. The feed solution is introduced into a vessel having a stripping zone containing a contacting element and is dispersed over the contacting element. The feed solution is flowed counter to and intimately contacted in the stripping zone with a motive gas to strip nitrites from solution and form a low-nitrite silver nitrate product solution.

22 Claims, 4 Drawing Sheets

PROCESS FOR REMOVING NITRITES FROM A SILVER NITRATE SOLUTION

CROSS REFERENCE TO RELATED APPLICATIONS

This application is a continuation-in-part of U.S. Ser. No. 821,666, filed Jan. 16, 1992 and now abandoned, which was a continuation-in-part of U.S. Ser. No. 650,145, filed Feb. 4, 1991 and now abandoned.

FIELD OF THE INVENTION

This invention pertains to a process for the removal of nitrite from a silver nitrate solution, and more particularly to a process for forming a low-nitrite silver nitrate product. The solution to be treated is introduced into a packed column or suitable vessel. The solution is counterflowed to, and intimately contacted with, a motive gas, whereby nitrite is stripped from the mixture to form, a the low-nitrite silver nitrate product.

BACKGROUND OF THE INVENTION

Silver nitrate which is of very high purity has many important industrial applications. For example, it is required for manufacture of photographic materials, for certain catalytic uses, and for use in the pharmaceutical industry. In the process that is generally used for preparing silver nitrate, metallic silver is reacted with nitric acid. A complex set of chemical reactions occurs during this reaction. Thus, reaction products other than silver nitrate are formed, including several oxides of nitrogen, such as nitric oxide (NO), nitrite ion ($NO_2^-$), and nitrous acid ($HNO_2$). In this specification, each of these products is called a "nitrite"; and collectively they are called "nitrites". Nitrites are impurities that can have a negative effect on silver nitrate for the above-stated uses. For example, it is known that nitrite present in silver nitrate adversely affects photographic properties of the silver nitrate in photographic applications. Accordingly, various methods have been tried to decrease the level of nitrite in silver nitrate. Prior workers have shown that this is not an easy task. The approaches taken have met with varying degrees of success.

It is known, for example, that the nitrite concentration in a batch of silver nitrate solution tends to decrease with time. It is also known that adding nitric acid to the solution can lower nitrite concentration. A disadvantage is that, with or without nitric acid, the reaction time required to achieve a significant decrease is lengthy; consequently, a high residence time of the silver nitrate solution in the batch reactor is required. The high residence time requires a large inventory of silver nitrate for a desired amount of low-nitrite silver nitrate product. Manufacturing costs are therefore high because of high silver inventory costs and the large processing facilities required.

Other methods to remove nitrite from nitrate solutions have also met with limited success. In one prior an approach, an effluent containing nitrate and nitrite is mixed with nitric acid to form a solution. The solution is contacted with oxygen or a gas containing oxygen, for example air or a mixture of air and nitrogen oxides. The solution is introduced to a reaction tower to which a partial vacuum is applied, resulting in the conversion of nitrous acid to nitric acid and the evolution of nitric oxide. A vacuum pump draws off the nitric oxide. A disadvantage of the process is that an unacceptably high level of nitrite remains after it is carried out.

In another prior art method of removing nitrite from solutions containing nitrate such as silver nitrate, oxygen is introduced to entrain nitrogen oxides for further use in the starting reaction forming the solution. The solution is then directed through a layer of the metal species such as granulated silver and through a lower layer comprising an inert material where it forms additional product and is collected. This approach has the above-enumerated disadvantages of the prior art, wherein costs are high and nitrite is not decreased to an acceptable level.

Still another prior an method involves removing nitrite from a batch solution containing a nitrate species and nitrite by controlling nitric acid concentration within a specified range while the solution is agitated thermally and/or a gas is introduced. A disadvantage of this approach is that the final nitrite concentration can be unacceptably high, and further process steps such as crystallization to further decrease nitrite concentration can be unacceptably slow as is the case for all prior art processes. Solution residence time for the process and residence time in the crystallizer are high. A high silver inventory can therefore be necessitated, resulting in high inventory costs and costly production facilities.

U.S. Pat. No. 1,039,325 discloses a process of making nitrates and nitric acid in which an effluent containing nitrate and nitrite is mixed with nitric acid to form a solution. The solution is contacted with oxygen, or a gas containing oxygen, for example air or a mixture of air and nitrogen oxides. The solution is introduced to a reaction tower to which a partial vacuum is applied, resulting in the conversion of nitrous acid to nitric acid and the evolution of nitric oxide. A vacuum pump draws off the nitric oxide.

U.S. Pat. No. 2,581,519 discloses a method of manufacturing metal nitrates such as silver nitrate. A solution of silver nitrate is directed from a main reactor into a tube above a column containing two layers of material, an upper layer of granulated silver and a lower layer of inert material. When the solution commences to flow into the tube, oxygen is passed up into the tube to entrain nitrogen oxides present in the tube for further use in the reaction. The solution then flows into the column where it forms additional silver nitrate after which it is collected as product. Oxides of nitrogen not reconverted to nitric acid pass through a conduit into an absorption tower where they are converted to nitric acid.

Japanese Kokai No. 52[11977]-60294 discloses a batch process for the removal of nitrous acid and nitrite from a silver nitrate solution containing nitrite. The process is carded out by controlling nitric acid concentration in the solution within a specified range while the solution is agitated thermally and/or a gas is introduced.

*Perry's Chemical Engineer's Handbook*, 6th Ed., Section 18, "Liquid-Gas Systems", Fair et al, Section 18, pp. 1–48, (later referred to as "Perry's") discloses systems such as packed columns for carrying out operations such as liquid-gas absorption and distillations.

U.S. Pat. No. 2,189,363 discloses a zig-zag tube apparatus for carrying out a process for the absorption of nitrous gases in water.

U.S. Pat. No. 4,419,333 discloses a process for removal of nitrous gases from gaseous mixtures by scrubbing with nitric acid followed by oxidation.

U.S. Pat. No. 4,925,643 discloses regenerating an aqueous liquid comprising nitric acid and nitrous acid or nitrogen oxides in a packed column. An oxygen-containing gas is passed into the liquid, converting the liquid substantially to nitric acid in the column.

WO 81/00397 discloses a process for reconstituting nitrogen oxide gases to nitric acid by contacting the gases in a packed column with nitric acid to thereby convert the gases to nitric acid.

SUMMARY OF THE INVENTION

This invention solves the prior an problems noted above. The process of the invention does not require a high residence time while producing a low-nitrite silver nitrate solution. The method of the invention is more economical than prior an methods. Silver inventory is low and the production equipment less costly compared to prior an methods, resulting in lower manufacturing costs.

The invention comprises a process of treating an aqueous silver nitrate feed solution containing nitrite and nitric acid, to decrease the nitrite concentration of the feed solution, comprising contacting the feed solution, at a temperature in the range of from about 80° C. to about the boiling point of the feed solution, with a flow of motive gas in a stripping zone of a vessel having a contacting element therein, such that the flow of the feed solution and the motive gas over the contacting element is sufficient to strip nitrite from the feed solution. The concentration of nitrite of the feed solution is thereby decreased to form a low-nitrite product solution, which is recovered from the vessel. Nitric acid can be introduced to the feed solution in order to provide a further decrease in the nitrite concentration of the product solution.

The motive gas can comprise a gas that is nonreactive with silver nitrate, such as nitrogen or carbon dioxide. The motive gas can also comprise oxygen, which is reactive with nitrites. The motive gas should not comprise other gases reactive with the feed solution in amounts that can increase the level of impurities in the silver nitrate product solution to an unacceptable level as determined by the operator. For example, sulfur dioxide can react to introduce impurities into the product solution and is an unacceptable motive gas. The operator can determine the allowable amounts of such reactive gases depending on the maximum impurity level desired in the product solution. Acceptable motive gases reactive with nitrites include oxygen gas, oxygen-enriched air, and air, and the like.

The motive gas is preferably heated and humidified, such as by contacting it with steam prior to being introduced into the vessel. The rate of stripping can be maintained at a deskable level by maintaining the temperature of the stripping zone via heating means on the vessel. For example, heating means can comprise heating tape wrapped on the outside surface of the vessel or a steam jacket around the vessel.

In one embodiment, the invention is a process of treating an initial aqueous silver nitrate solution containing nitrite to decrease the concentration of nitrite, the process comprising the steps of:

contacting the initial solution with nitric acid to form a feed solution containing nitrite and nitric acid;
establishing the temperature of the feed solution in the range of from about 80° C. to about the boiling point of the feed solution;
introducing the feed solution into a vessel, the vessel having a stripping zone containing a contacting element therein, at a first location upstream of the stripping zone;
introducing a motive gas into the vessel downstream of the first location at a second location so located that the motive gas can contact at least some of the feed solution in the stripping zone as the motive gas flows through the vessel;
dispersing the feed solution over the contacting element and permitting the feed solution to intimately contact the gas to thereby strip nitrite from the feed solution to form a low-nitrite product solution;
removing exhaust gases from the vessel; and
collecting the product solution from the vessel.

The method of the invention results in improved contact between the solution containing nitrite and the motive gas, resulting in improved removal of nitrite, such as nitrous acid and nitrite ion, from the solution. The dispersion of the liquid phase over the contacting element, as well as the intimate contacting of motive gas and liquid maximizing the driving force for mass transfer, provide the advantage of better mass transfer from liquid to gas of such nitrogen oxide gases.

The silver nitrate made by the process of this invention contains a low nitrite concentration. It can be used in applications requiring silver nitrate free or substantially free of such contaminants. For example, low-nitrite silver nitrate is useful as a catalyst. Another important use of low-nitrite silver nitrate is for the manufacture of silver halide photographic film emulsions.

BRIEF DESCRIPTION OF THE DRAWING

The foregoing and other objectives, features and advantages will be apparent from the following more particularized description of the preferred embodiments of the invention, as illustrated in the accompanying drawings, in which.

DESCRIPTION OF THE PREFERRED EMBODIMENTS

The following is a detailed description of the preferred embodiments of the invention, reference being made to the drawings in which the same reference numerals identify the same elements of structure in each of the several Figures.

One reaction path for the reaction of metallic silver with nitric acid to form a solution of silver nitrate can be expressed as:

$$4Ag + 6HNO_3 \rightleftharpoons 4AgNO_3 + NO \uparrow + NO_2 \uparrow + 3H_2O \qquad (I)$$

Another reaction path for the reaction can be expressed as:

$$3Ag + 4HNO_3 \rightleftharpoons 3AgNO_3 + NO\uparrow + 2H_2O \quad (II)$$

Other liquid phase reactions can be expressed as:

$$HNO_2 + HNO_3 \rightleftharpoons 2NO_2\uparrow + H_2O \quad (III)$$

and $$3HNO_2 \rightleftharpoons HNO_3 + 2NO\uparrow + H_2O \quad (IV)$$

Gas phase reactions can be expressed as:

$$2NO + O_2 \rightarrow 2NO_2 \quad (V)$$

and $$3NO_2 + H_2O \rightleftharpoons 2HNO_3 + NO\uparrow \quad (VI)$$

The above reactions can be considered reversible with the exception of reaction V. Nitrogen oxides, that is gases having the general formula $NO_x$ such as NO and $NO_2$ formed in reactions (I) and (II) above, can promote the formation of nitrous acid ($HNO_2$) as in reactions (III) and (IV). Nitric oxide (NO) and nitrogen dioxide ($NO_2$) formed in reactions (I) and (II), as well as nitrous acid ($HNO_2$) and its dissociated nitrite ion ($NO_2^-$), are collectively called "nitrites". Nitrite is generally present in varying quantities in untreated solutions of silver nitrate.

Nitrite formation is particularly high when starting out with finely divided silver, or precipitated silver crystals, in reactions (I) and (II). The concentration of nitrite in solution is also dependent on the relative concentrations of reactants in the above equations. For example, the concentration of nitrous acid in the silver nitrate solution is affected by the concentration of free nitric acid in the solution shown in reaction (III). Adding nitric acid to solution decreases nitrous acid concentration. Removing nitric oxide from solution as in reaction (IV) achieves a decrease in the concentration of nitrous acid and of nitrite in the solution.

The first step of one embodiment of the invention comprises efficiently contacting an initial silver nitrate solution with nitric acid to form a feed solution containing nitrite and nitric acid. Preferably, nitric acid is added in an amount such that the weight proportion of nitric acid in the feed solution is in the range of from about 0.5 percent to about an amount not exceeding the crystallization point of the feed solution. "Crystallization point" is the minimum concentration of nitric acid at which solute precipitates from solution, and is dependent on the solution temperature. For a silver nitrate feed solution as described herein, crystallization point is the minimum concentration of nitric acid at which silver nitrate starts to precipitate from solution. One skilled in the an can readily determine the crystallization point of a silver nitrate solution containing nitric acid and nitrite, in which nitric acid is the species and silver nitrate the solute. For example, in an aqueous silver nitrate solution having a silver nitrate concentration of about 50 weight percent, containing about 3000 µg/ml nitrite, and having a nitric acid concentration of about 20 weight percent, the crystallization point occurs at a temperature of about 80° C. It is desirable, however, not to operate at too high a nitric acid concentration because addition of significant quantities of silver oxide or other neutralizing agents may be necessary to produce a usable silver nitrate product. In a particularly preferred embodiment, the weight proportion of nitric acid in the feed solution is in the range of from about 1 percent to about 2 percent.

Any convenient means of efficiently contacting the silver nitrate solution with nitric acid may be employed. For example, nitric acid may be added to the solution by using a conventional globe-valve mixer. In a preferred embodiment, nitric acid and silver nitrate solution are efficiently contacted by concurrent, turbulent flow through a common pipeline to form a feed solution that is then introduced to the vessel further described below. Alternatively, nitric acid can be introduced directly to the vessel to contact the silver nitrate solution therein.

The temperature of the feed solution is established in the range from about 80° C. to about the boiling point of the feed solution. This can be carried out using any conventional temperature regulating means, for example, by running the feed solution through a heat exchanger that is associated with a thermocouple and a temperature-regulated flow control valve. A preferred temperature range of the feed solution is from about 90° C. to about the boiling point of the feed solution.

The feed solution is then introduced into a vessel, the vessel having a stripping zone containing a contacting element therein, at a first location upstream of stripping zone, while introducing a motive gas into the vessel downstream of the first location at a second location so located that the motive gas can contact at least some of the feed solution in the stripping zone as the motive gas flows through the vessel. In one embodiment employing counterflow as described below, the vessel is a column having a packed section. The feed solution is introduced into the column at a location upstream of the packed section, and the motive gas is introduced into the column at a location downstream of the packed section. The column and the packing should each be of a material that is substantially nonreactive with the feed silver nitrate solution containing nitrite and nitric acid. For example, the column can comprise a glass column, and the packing can be a ceramic material. Alternatively, the column can comprise a metal such as stainless steel. One skilled in the art can readily select a suitable column and packing material compatible with the materials utilized or produced in the invention.

Any type of contacting element can suffice in the practice of the invention. For example, a packing such as a structured packing, or a dumped packing element such as Raschig rings or Pall-type rings, can be employed. Such packings are well known in the art and are described, for example, in Perry's, previously mentioned and incorporated herein by reference. A preferred packing is a well-known packing commercially available under the name Koch-Sulzer packing (see Perry's at p. 18–29). A preferred surface to volume ratio for a packing employed in the invention is in the range of from about 100 m²/m³ to about 800 m²/m³. Alternatively, when practicing counterflow as described below, a contacting element can in addition to the above-described packings also comprise trays, for example. sieve trays, bubble cap trays, or valve trays, as are well known in the art.

Contacting elements of the invention also include thin film reactors such as plate columns and wetted-wall columns, examples of which are described in Perry's at pp. 18-1 to 18-48 and in U.S. Pat. Nos. 2,189,363, U.S. Pat. No. 3,482,947, and U.S. Pat. No. 4,604,362. The patents disclose a zig-zag tube design, a vertical tube design, and a spinning barrel design, respectively. Another well known type of thin film reactor also within the scope of the invention is an inclined plane reactor.

A preferred ratio of the mass flow rate of feed solution to the mass flow rate of motive gas is in the range of from about 10 to about 60. The motive gas can comprise nitrogen or carbon dioxide. The motive gas can also comprise an oxygen-containing gas such as air. The motive gas should not comprise amounts of other gases reactive with the process feed solution in more than trace amounts, that is, amounts that would generate unacceptable levels of impurities in the desired high purity product solution. Air is a preferred motive gas because it is readily available inexpensive to provide. Also, air can provide improved performance over non-oxygen containing gases as described in the Examples herein. It is preferred that the motive gas be heated and humidified before introduction to the column. For example, when the motive gas is air, steam can be added to both heat and humidify the air. A preferred relative humidity of humidified air is in the range of from about 75 percent to about 100 percent. A preferred temperature of humidified air is in the range of from about 80° C. to about 100° C.

In a preferred embodiment, the rate of stripping can be maintained at a desirable level by maintaining the temperature of the stripping zone via heating means on the vessel. Such heating means can comprise, for example, heating tape wrapped on the outside surface of a packed column. Means for heating a vessel such as a packed column can also comprise a steam jacket on the outside surface of the vessel, to which steam is provided to heat the vessel and from which steam condensate is removed by condensate collection means. It is preferred that the temperature of the stripping zone is maintained by maintaining the temperature of the vessel in the range of from about 80° C. to about the boiling point of the feed solution. One skilled in the art can readily determine the boiling point, which can vary depending on the concentrations of the components of the feed solution and on factors such as the pressure within the vessel.

The feed solution is dispersed over the contacting element and permitted to intimately contact the gas to thereby strip nitrite from the feed solution and form a low-nitrite product solution. Means for dispersing the feed solution over the contacting element can comprise any conventional dispersing means. For example, when using a packed column, a preferred means for dispersing is a dispersing plate, having a plurality of orifices therethrough, situated within the column above the packed section. Representative cross-flow dispersion apparatus, relating to the cross flow embodiment of the invention further described below, is described in Perry's at pp. 18-1 to 18-19, incorporated herein by reference.

In one embodiment, the feed solution is flowed substantially counter to the flow of gas by any convenient means known in the art. The flow rate of liquid through the contacting element can be readily selected by the operator based on the hydraulic characteristics of the vessel and contacting element. Such characteristics include columnar pressure drop, column diameter, column height, type of contacting element used, contacting element surface area, percent void space, surface to volume ratio, liquid holdup, static liquid holdup, residence time, and wetting point. Packed column characteristics further include flooding point and packing weight.

"Surface to volume ratio" of a contacting element varies for different types and configurations of contacting elements, and can affect the efficiency of the packing for liquid-gas mass transfer. "Liquid holdup" is the total volume of liquid adhering to the contacting element at steady state liquid flow conditions. "Static liquid holdup" is a component of liquid holdup, and can be defined as the volume of liquid adhering to the contacting element in a no-flow condition, after the contacting element is wetted and then drained. "Residence time" is the amount of time liquid resides in the vessel at an equilibrium flow rate and is equal to the liquid holdup divided by liquid flow rate. Stated another way, residence time is the amount of time from when liquid enters the vessel to when the same liquid exits the vessel, for a steady-state liquid flow rate.

"Wetting point" can be defined as the minimum liquid flow rate sufficient to maintain the contacting element surfaces wet. The wetting point, which is dependent on the geometry of the contacting element, is readily determinable by one skilled in the art, and for packings is usually specified by the manufacturer. Liquid flow rate should exceed the wetting point because contacting efficiency can rapidly decrease at liquid flow rates below the wetting point.

"Flooding" is a packed column characteristic that can be defined as the formation of a continuous liquid surface across the vessel and generally first occurs at the top of the packing. As described in Perry's at pp. 18-22-18-24, the flooding point is a function of the ratio of the mass flow rate of liquid to the mass flow rate of motive gas in the vessel or column, as well as a function of the packing characteristics. Typical counterflow flooding curves and flooding points, as well as curves and data on other parameters such as columnar pressure drop, for representative packed columns are described in Perry's at pp. 18-21 to 18-41, incorporated herein by reference. Flooding can decrease the amount of contacting between the feed solution and the motive gas, resulting in poor stripping of nitrite from solution. Appropriate feed solution and gas flow rates to avoid flooding in the practice of the invention may be determined by testing without undue experimentation by using the above described curves and data to calculate appropriate flow rates.

Generally, as liquid flow rate through the vessel is increased, increasing liquid holdup and decreasing residence time, nitrite removal decreases. The operator can select a liquid flow rate for a predetermined decrease in nitrite, and also select the size of the vessel and associated apparatus to achieve a desired rate of product manufacture. A preferred flow rate of liquid, e.g. feed solution, is not below the wetting point of the contacting element. In a packed column, a preferred ratio of the mass flow rate of liquid, e.g. feed solution, to the mass flow rate of motive gas through the contacting element in the counterflow embodiment is not above the ratio of the mass flow rate of the liquid to the mass flow rate of the motive gas at about the flooding point of the packed column. In a preferred embodiment, the nitrite concentration of the initial solution is in the range of from about 7300 $\mu$g/ml to about 9400 $\mu$g/ml and the nitrite concentration of the product solution is in the range of from about 0.4 $\mu$g/ml to about 13 $\mu$g/ml.

A motive gas flow rate can be selected to produce good stripping of nitrite for a selected liquid flow rate. One skilled in the art can readily select a motive gas flow rate from characteristic loading zone curves, for example as in Perry's at pp. 18-21 and as provided by the manufacturer. A preferred ratio of liquid mass flow rate to gas mass flow rate is in the range of from about 10 to about 60.

A preferred direction of flow of solution in a packed column is down-flow through the packed column and counter to motive gas flow upward through the column. The feed solution can be introduced at the top of the column and the gas introduced at the bottom of the column.

Alternatively, cross-flow can be employed, wherein liquid is introduced at the top of the vessel and dispersed over the packing. Product is collected from the bottom of the vessel. The motive gas is introduced at a side of the vessel and is removed from an opposite side of the vessel. Other variations are possible, are known in the art, and are described in references such as Perry's.

The gases stripped from solution are removed from the vessel as exhaust gases. Means for removing exhaust gases is provided, which in one embodiment comprises one or more exhaust ports at the top of the vessel. Exhaust gases containing nitrite can be treated and/or disposed of by any conventional means. For example, the gases can be introduced into a dilute solution of nitric acid, which solution can then be treated in a conventional scrubbing column in which nitrogen oxides are oxidized. The solution can then be diluted with caustic solution and discharged into the environment in compliance with applicable environmental discharge limits.

The product solution is collected from the vessel. Any conventional means for collecting may be used, for example, the product can be pumped to a holding tank, or it can be directly conveyed to silver nitrate processing means, for example a silver nitrate crystallizer.

Figure 1:
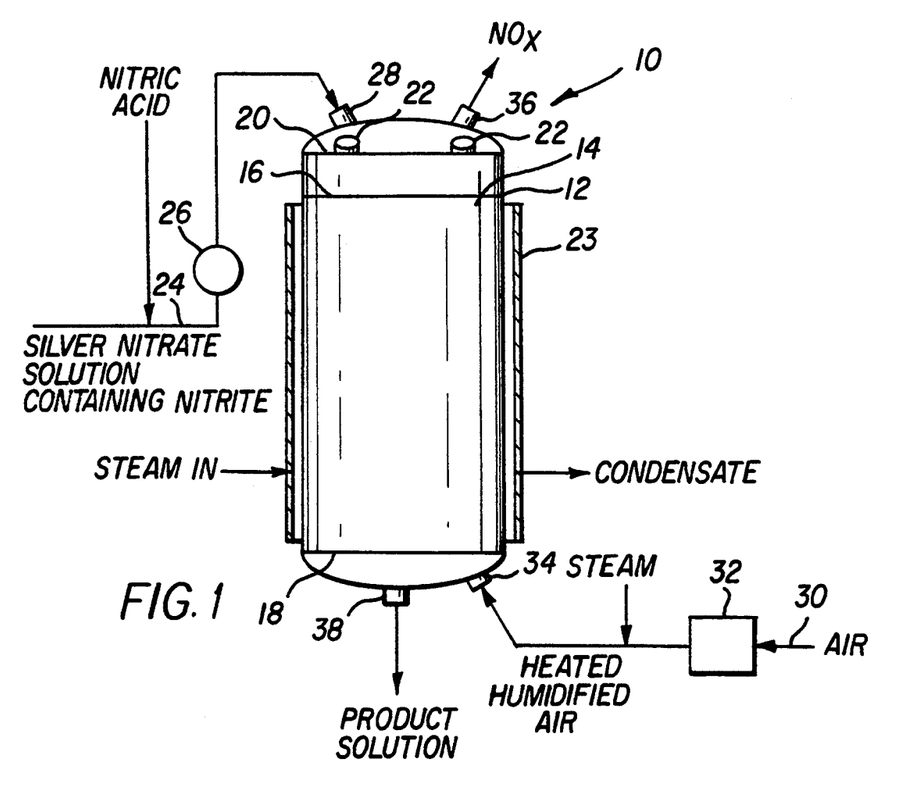
FIG. 1 is a schematic representation, partly in cross section and not to scale, of a packed column and attendant equipment in accordance with certain embodiments of this invention.

The process of the invention is further illustrated in FIG. 1 which schematically illustrates a preferred embodiment of the invention. Column 10 is positioned vertically as shown, having a stripping zone 12 containing contacting element 14. Stripping zone 12 can comprise a packed section and contacting element 14 can comprise a packing. An upper hold-down plate 16 and a lower support plate 18 secure contacting element 14 within column 10. A distributor plate 20 having orifices 22 is positioned above stripping zone 12 to produce uniform liquid dispersion over contacting element 14. Steam supply means (not illustrated) feeds steam jacket 23 for heating the outer surface of column 10. Steam condensate is removed by conventional condensate collection means (not illustrated). A feed solution of silver nitrate containing nitrite is supplied by feedline 24. Heater 26 is provided to heat the solution which is then introduced into the top of column 10 through liquid inlet port 28. A motive gas is supplied through feedline 30. Heater 32 is provided to heat the motive gas, which is then introduced into the bottom of column 10 through gas inlet port 34. Gas outlet port 36 is provided at the top of column 10 for removing exhaust gases. Silver nitrate product solution is collected from column 10 at liquid outlet port 38.

Feed flow rates of the feed solution to the column can be controlled by any conventional flow control means, for example with a variable flow metering pump (not illustrated). Motive gas flow can be controlled by any conventional gas flow control means, such as a rotometer (not illustrated).

In one method of the invention, silver nitrate solution containing nitrite is efficiently contacted by turbulent mixing with nitric acid in feedline 24 to form a feed solution that is heated in heat exchanger 26 to a predetermined temperature within the above-stated temperature range. The heated feed solution is then introduced to column 10 through liquid inlet port 28. Thus, the feed solution enters the column upstream of distributor plate 20, which distributes the feed solution over contacting element 14. Concurrently, air is supplied by line 30, heated in heater 32, and humidified with steam. The heated, humidified air is introduced into column 10 downstream of distributor plate 20 through gas inlet port 34. While liquid and gas are thus supplied to column 10, steam is provided to column 10 to maintain a predetermined column temperature. Feed solution flows downward through contacting element 14 and counter to the upward flow of humidified air through contacting element 14. Silver nitrate product solution is collected from liquid outlet port line 38 at the bottom of column 10, and exhaust gases, which include air and nitrogen oxides, are removed through gas outlet port 36.

The invention is further illustrated by the following examples of its practice.

EXAMPLES 1-4

In these examples, tests were run using a glass column and packing as specified below. Column temperature was maintained by means of heating tapes wrapped around the length of the column for the tests shown in Table I below, and with a steam-jacketed column for the tests shown in Tables II-IV below. Nitric acid was added to an aqueous silver nitrate solution as a feed stream, and the feed stream was preheated and fed to the top of the column. Feed stream flow rate to the column was controlled using a variable flow metering pump. Air was humidified to saturation at 70° C. for the test runs indicated and fed into the bottom of the column. The tests were carried out with a continuous feed stream and a continuous motive gas flow for 30 minutes. Metered flow rates reported herein were equilibrium flow rates. That is, liquid and gas flow rates into the column were substantially equal to the respective liquid and gas flow rates exiting the column. Samples of the product stream from the column were collected. The samples were tested for silver nitrate, nitrite, and acid concentrations. Chemoluminescense methods were used for measuring nitrite concentration. Acid concentration was determined by titration. Silver nitrate concentration was determined by specific gravity measurement. Aerating gas and feed stream flow rates are expressed in volumetric units per square meter of column crosssection.

In the tables, "NA" indicates that data is not available. "Liquid/Gas" is the mass ratio of the feed stream ("liquid") flow to the gas flow into the column. "Input Conditions" references liquid and gas parameters of liquid and gas prior to or entering the column as described in the Tables therein and further described as follows.

[Nitrite]$_i$=initial nitrite concentration in unacidified AgNO$_3$ solution

[Nitrite]FS$_i$=initial nitrite concentration in acidified feed stream

[Acid]$_i$=weight percent acid in acidified feed stream

[AgNO$_3$]$_i$=weight percent silver nitrate in acidified feed stream $V_{FS}$ = Feed stream flow rate, expressed both as a rate and as a rate relative to total packing surface area, in the indicated units $V_G$ = Gas flow rate, expressed both as a rate and as a rate relative to total packing surface area, in the indicated units $M_L/M_G$ = Ratio of liquid mass flow rate to gas mass flow rate "Exit Conditions" references parameters of solution exiting the column as follows:

[Acid]$_f$ = weight percent of acid in product solution
[AgNO$_3$]$_f$ = weight percent of silver nitrate in product solution
(Nitrite]$_f$ = nitrite concentration in product solution

TABLE I

Column Diameter = 1 inch (2.54 cm); Column Height = 5 ft. (1.53 m); Column Packing = ¼ inch (0.64 cm) Cannon, 228 g

| | Test Run | | | | | | |
|---|---|---|---|---|---|---|---|
| | 1 | 2 | 3 | 4 | 5 | 6 | 7 |
| Input Conditions | | | | | | | |
| [Nitrites]$_i$ (µg/ml) | 6100 | NA | 6800 | NA | 7100 | 7100 | 7300 |
| [Nitrites]FS$_i$ (µg/ml) | 5600 | 5100 | 2700 | 5400 | 5100 | 5100 | 5400 |
| [Acid]$_i$ (%) | 1.02 | 1.07 | 0.80 | 0.80 | 1.0 | 1.0 | 1.06 |
| [AgNO$_3$]$_i$ (%) | 51.3 | 49.5 | 50.8 | 52.0 | 51.9 | 51.9 | 60.5 |
| Feed stream temperature, degrees C. | 90 | 90 | 80 | 80 | 87 | 85 | 87 |
| $V_G$ (cc/sec) | 23.6 | 15.7 | 39.3 | 39.3 | 7.9 | 7.9 | 39.3 |
| $V_G$ (m$^3$/m./m$^2$ packing) | 2.8 | 1.9 | 4.7 | 4.7 | 0.8 | 0.8 | 4.7 |
| $V_{FS}$ (ml/m.) | 8 | 20 | 20 | 20 | 17 | 20 | 10 |
| $V_{FS}$ (l/m./m$^2$ packing) | 15.5 | 39.1 | 39.1 | 39.1 | 33.4 | 39.1 | 19.6 |
| $V_G/V_{FS}$ (m$^3$/hr/l) | 10.9 | 5.8 | 14.3 | 14.3 | 1.7 | 1.4 | 14.3 |
| $M_L/M_G$ | 9.5 | 35.7 | 14.3 | 14.3 | 60.7 | 71.4 | 7.1 |
| Exit Conditions: | | | | | | | |
| [Acid]$_f$ (%) | 0.86 | 0.77 | 0.58 | 0.65 | 0.93 | 0.90 | 0.88 |
| [AgNO$_3$]$_f$ (%) | 58.9 | 57.5 | 53.6 | 53.3 | 52.3 | 52.8 | 63.8 |
| [Nitrites]$_f$ (µg/ml) | 0.83 | 0.81 | 4.4 | 3.0 | 1.8 | 1.4 | 0.4 |
| Percent decrease of nitrites concentration in product solution relative to acidified feed stream | 99.99 | 99.99 | 99.83 | 99.94 | 99.96 | 99.97 | 99.99 |

TABLE II

Column Diameter = 2 inches (5.08 cm); Column Height = 70 inches (91.78 m); Column Packing = ⅜ inch (0.95 cm) Raschig Rings, 4996 g

| | Test Run | | | | | |
|---|---|---|---|---|---|---|
| | 1 | 2 | 3 | 4 | 5 | 6 |
| Input Conditions: | | | | | | |
| [Nitrites]$_i$ (µg/ml) | 8800 | 8800 | 8800 | 6600 | 6600 | 6600 |
| [Nitrites]FS$_i$ (µg/ml) | 8700 | 8700 | 8700 | 4800 | 4800 | 4800 |
| [Acid]$_i$ (%) | 1.0 | 1.0 | 1.0 | 1.06 | 1.06 | 1.06 |
| [AgNO$_3$]$_i$ (%) | 57.0 | 57.0 | 57.0 | 59.4 | 59.4 | 59.4 |
| Feed stream temperature, degrees C. | 47 | 35 | 36 | 79 | 68 | 68 |
| Column temperature, degrees C. | 89 | 90 | 91 | 92 | 94 | 92 |
| Air temperature, degrees C. | 20 | 20 | 73 | 82 | 82 | 78 |
| Humidification of air | no | no | yes | yes | yes | yes |
| $V_G$ (cc/sec) | 78.7 | 78.7 | 78.7 | 39.3 | 39.3 | 78.7 |
| $V_G$ (m$^3$/m./m$^2$ packing) | 2.3 | 2.3 | 2.3 | 1.2 | 1.2 | 2.3 |
| $V_{FS}$ (ml/m.) | 30 | 62 | 62 | 29 | 63 | 63 |
| $V_{FS}$ (l/m./m$^2$ packing) | 14.3 | 30.6 | 30.6 | 14.3 | 31 | 31 |
| $V_G/V_{FS}$ (m$^3$/hr/l) | 9.5 | 4.5 | 4.5 | 4.9 | 2.2 | 4.5 |
| $M_L/M_G$ | 10.0 | 20.7 | 20.7 | 20.2 | 44.1 | 22.3 |
| Exit Conditions: | | | | | | |
| [Acid]$_f$ (%) | 0.83 | 0.80 | 0.80 | 0.82 | 0.80 | 0.80 |
| [AgNO$_3$]$_f$ (%) | 59.0 | 58.0 | 58.5 | 61.8 | 61.5 | 62.4 |
| [Nitrites]$_f$ (µg/ml) | 16 | 62 | 56 | 6.1 | 19 | 32 |
| Percent decrease of nitrites concentration in product solution relative to acidified feed stream | 99.82 | 99.29 | 99.36 | 99.86 | 99.60 | 99.33 |

TABLE III

Column Diameter = 2 inches (5.08 cm); Column Height = 70 inches (1.78 m); Column Packing = ¾ inch (1.9 cm) Pall Rings, 1428 g

| | Test Run | | | | | | |
|---|---|---|---|---|---|---|---|
| | 1 | 2 | 3 | 4 | 5 | 6 | 7 |
| Input Conditions: | | | | | | | |
| [Nitrites]$_i$ (µg/ml) | 8300 | 7600 | 6200 | 5900 | 5900 | 9400 | 9400 |
| [Nitrites]FS$_i$ (µg/ml) | 7100 | 3500 | NA | 5400 | 5400 | 7700 | 7700 |
| [Acid]$_i$ (%) | 1.04 | 0.88 | 0.86 | 1.17 | 1.17 | 0.99 | 0.99 |
| [AgNO$_3$]$_i$ (%) | 63.6 | 63.1 | 63.1 | 46.6 | 46.6 | 54.8 | 54.8 |
| Feed stream temperature, degrees C. | 60 | 58 | 48 | 37 | 37 | 73 | 79 |
| Column temperature, degrees C. | 86 | 84 | 84 | 88 | 86 | 86 | 87 |
| Air temperature, degrees C. | NA | NA | NA | 71 | 68 | 30 | 30 |
| Humidification of air | no | no | no | yes | yes | no | no |
| $V_G$ (cc/sec) | 39.3 | 39.3 | NA | 39.3 | 78.7 | 78.7 | 78.7 |
| $V_G$ (m$^3$/m./m$^2$ packing) | 1.2 | 1.2 | 1.2 | 1.2 | 2.3 | 2.3 | 2.3 |
| $V_{FS}$ (ml/m.) | 10 | 19 | 29 | 62 | 62 | 60 | 34 |
| $V_{FS}$ (l/m./m$^2$ packing) | 4.9 | 9.4 | 14.3 | 30.6 | 30.6 | 29.3 | 16.7 |
| $V_G/V_{FS}$ (m$^3$/hr/l) | 14.2 | 7.4 | 4.9 | 2.3 | 4.5 | 4.8 | 8.3 |
| $M_L/M_G$ | 7.9 | 14.3 | 21.2 | 35.5 | 17.9 | 18.8 | 9.1 |
| Exit Conditions: | | | | | | | |
| [Acid]$_f$ (%) | 0.80 | 0.75 | 0.61 | 1.10 | 1.06 | 0.62 | 0.63 |
| [AgNO$_3$]$_f$ (%) | 70.0 | 66.0 | 64.8 | 47.3 | 47.4 | 57.5 | 59.0 |
| [Nitrites]$_f$ (µg/ml) | 8.0 | 50 | 45 | 16 | 12 | 61 | 13 |
| Percent decrease of nitrites concentration in product solution relative to acidified feed stream | 99.89 | 98.57 | NA | 99.70 | 99.78 | 99.21 | 99.83 |

TABLE IV

Column Diameter = 2 inches (5.08 cm); Column Height = 70 inches (1.78 m); Column Packing = ¼ inch (0.64 cm) Cannon, 1227 g

| | Test Run | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Input Conditions: | | | | | | | | | | | | |
| [Nitrites]$_i$ (µg/ml) | 6900 | 6900 | 6900 | 9200 | 9200 | 9200 | 9900 | 9900 | 9900 | 8900 | 8900 | 8900 |
| [Nitrites]FS$_i$ (µg/ml) | 2900 | 2800 | 2800 | 4300 | 4300 | 4300 | 9100 | 9100 | 9100 | 5800 | 5000 | 5200 |
| [Acid]$_i$ (%) | 1.18 | 1.18 | 1.18 | 1.14 | 1.14 | 1.14 | 0.92 | 0.92 | 0.92 | 0.58 | 2.01 | 5.03 |
| [AgNO$_3$]$_i$ (%) | 57.6 | 57.6 | 57.6 | 54.5 | 54.5 | 54.5 | 56.6 | 56.6 | 56.6 | 59.5 | 59.5 | 59.5 |
| Feed stream temperature, degrees C. | 71 | 71 | 78 | 72 | 76 | 80 | 66 | 77 | 77 | 76 | 75 | 72 |
| Column temperature, degrees C. | 92 | 93 | 93 | 86 | 88 | 87 | 84 | 84 | 83 | 86 | 87 | 88 |

TABLE IV-continued

Column Diameter = 2 inches (5.08 cm); Column Height = 70 inches (1.78 m);
Column Packing = ¼ inch (0.64 cm) Cannon, 1227 g

| | Test Run | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Air temperature, degrees C. | 19 | 18 | 19 | 22 | 22 | 22 | 17 | 17 | 17 | 60 | 59 | 58 |
| Humidification of air | no | no | no | no | no | no | no | no | no | yes | yes | yes |
| $V_G$ (cc/sec) | 78.7 | 39.3 | 39.3 | 78.7 | 39.3 | 39.3 | 78.7 | 78.7 | 78.7 | 78.7 | 78.7 | 78.7 |
| $V_G$ (m³/m./m² packing) | 2.3 | 1.2 | 1.2 | 2.3 | 1.2 | 1.2 | 2.3 | 2.3 | 2.3 | 2.3 | 2.3 | 2.3 |
| $V_{FS}$ (ml/m.) | 61 | 62 | 35 | 65 | 66 | 30 | 65 | 35 | 35 | 35 | 35 | 34 |
| $V_{FS}$ (l/m./m² packing) | 30.2 | 30.6 | 17.1 | 32.2 | 32.6 | 14.7 | 32.2 | 17.1 | 17.1 | 17.1 | 17.1 | 16.7 |
| $V_G/V_{FS}$ (m³/hr/l) | 4.7 | 2.3 | 4.1 | 4.3 | 2.2 | 4.8 | 4.3 | 8.1 | 8.1 | 8.1 | 8.1 | 8.3 |
| $M_L/M_G$ | 20.2 | 41.3 | 23.3 | 21.5 | 42.0 | 19.5 | 21.9 | 11.9 | 12.0 | 12.1 | 12.2 | 11.6 |
| Exit Conditions: | | | | | | | | | | | | |
| $[Acid]_f$ (%) | 1.2 | 1.1 | 0.80 | 12.0 | 13.0 | 2.0 | 0.53 | 0.51 | 0.52 | 0.16 | 1.80 | 4.90 |
| $[AgNO_3]_f$ (%) | 99.96 | 99.96 | 99.97 | 99.72 | 99.69 | 99.95 | 58.3 | 59.7 | 61.0 | 61.0 | 61.5 | 59.5 |
| $[Nitrites]_f$ (µg/ml) | 16 | 62 | 56 | 6.1 | 19 | 32 | 31 | 6.0 | 5.5 | 110 | 2.00 | 0.50 |
| Percent decrease of nitrites concentration in product solution relative to acidified feed stream | 99.82 | 99.29 | 99.36 | 99.86 | 99.60 | 99.33 | 99.66 | 99.93 | 99.94 | 98.10 | 99.96 | 99.99 |

The above results demonstrate that the process of the invention can provide a high-purity product solution having a nitrite concentration that is lower than that provided by prior art methods. The results shown in Table I show good decreases in nitrite, evidenced by the measurements of nitrite concentration in product solution ($[Nitrite]_f$) and of the percent decrease of nitrite. Lower acidified feed stream flow rate (see also Table V below), higher acid concentration in the feed stream, and higher acidified feed stream temperature each independently correlate with improved decreases in nitrite.

Figure 2:
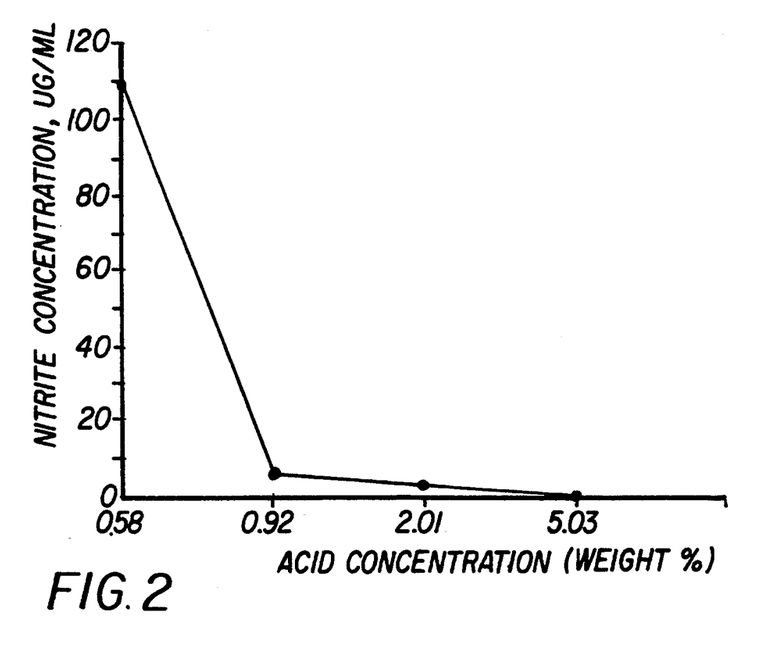
FIG. 2 is a plot of exit solution nitrite concentration against feed stream nitric acid concentration.

The results shown in Tables II-IV show the effects of several parameters on the practice of the invention. Acidified feed stream temperatures of 80° C. and above exhibited good decreases in nitrite. The concentration of acid in the feed stream has a significant effect, as is further shown in FIG. 2 plotted for runs 10, 11, and 12 of Table IV. As shown therein, acid concentrations of about 0.8 percent and up produce good decreases in nitrite.

As may be seen in Table II in runs 2 and 3, with other parameters being similar, the amount of decrease in nitrite was higher for humidified air as compared with nonhumidified air.

Figure 4:
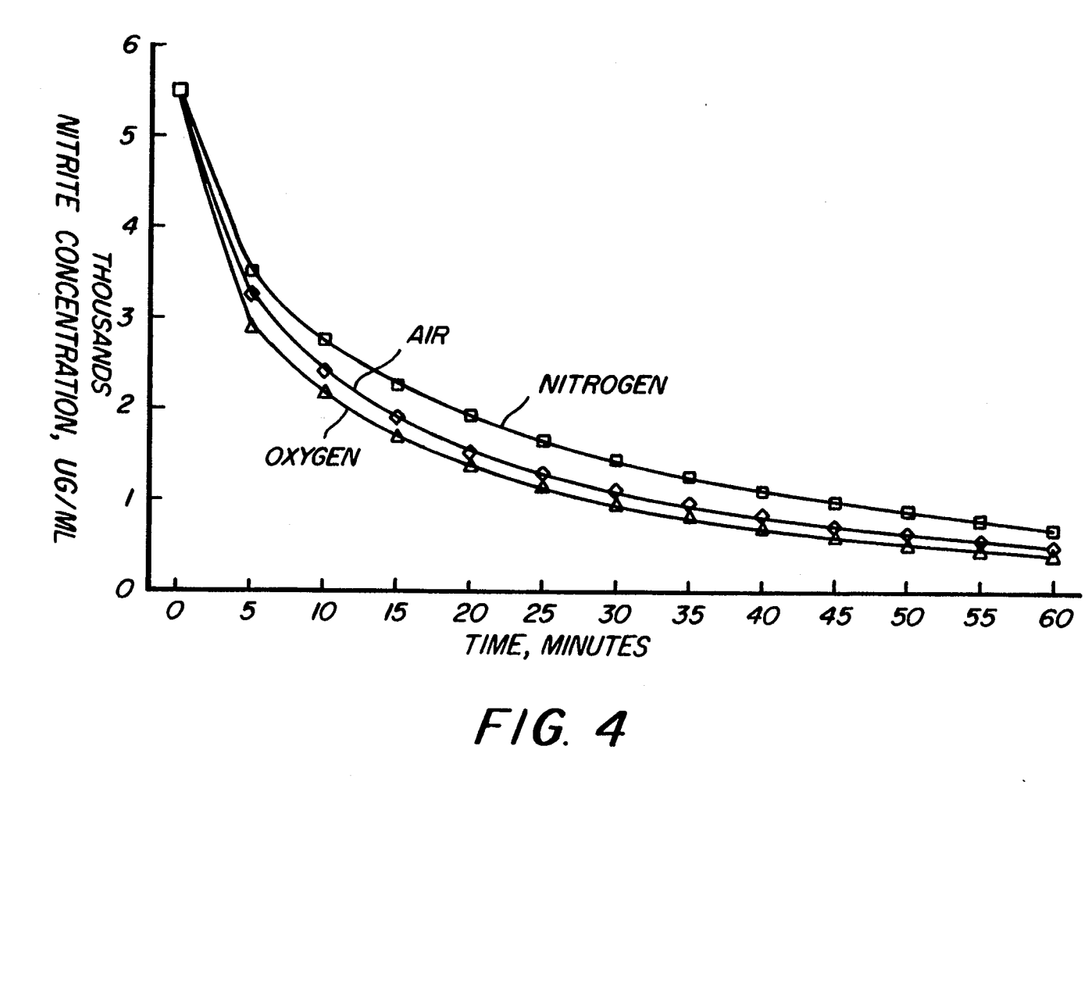
FIG. 4 is a plot of nitrite concentration against time for selected motive gases of the invention.

Run 9 of Table IV was conducted using nitrogen as the motive gas, while run 8 of Table IV was conducted under similar reaction conditions but using air as the motive gas. Good nitrite decreases were obtained with each gas. A further comparison of the effectiveness of the reactive and nonreactive motive gases of the invention was performed independently testing air, oxygen, and nitrogen as motive gases. The motive gas was introduced into a vessel containing an acidified silver nitrate solution at a temperature of about 80° C. The motive gas was bubbled through the solution at a flow rate of 5 cfh (39.4 cc/sec) and the exhaust gases removed. The nitrite concentration of the solution was measured over time and the results are shown in FIG. 4. The results again show that nitrogen is effective as a motive gas in decreasing nitrite concentration in the solution, which decrease is nominally less than that provided by oxygen or air.

Test results from the above examples demonstrating a comparison between the different types of packing are summarized below in Table V for the test runs stated therein.

TABLE V

| Packing | Run | Temp deg. C. | $V_{FS}$ (ml/m.) | $V_G$ (cc/sec) | $[Acid]_i$ (%) | $[Nitrite]_f$ (µg/ml) |
|---|---|---|---|---|---|---|
| Cannon | Table IV, Run 8 | 84 | 35 | 78.7 | 0.92 | 6 |
| Cannon | Table IV, Run 7 | 84 | 65 | 78.7 | 0.92 | 31 |
| Raschig | Table II, Run 1 | 89 | 30 | 78.7 | 1.0 | 16 |
| Raschig | Table II, Run 2 | 90 | 62 | 78.7 | 1.0 | 62 |
| Pall-type | Table III, Run 7 | 87 | 34 | 78.7 | 0.99 | 13 |
| Pall-type | Table III, Run 6 | 86 | 60 | 78.7 | 0.99 | 61 |

As may be seen from Table V, the type of packing employed affects process performance. Cannon high efficiency packing exhibits good performance, and the results show that Raschig and Pall-type rings also are effective in removing nitrite.

EXAMPLE 5

Tests were also run to compare Cannon packing with the above-described Koch-Sulzer packing. The tests were conducted with a 2 inch diameter column having a height of 30 inches and using the above-described procedure of Examples 1-4. Data for the tests using Cannon packing is shown in Table VI below. Data for the tests using Koch-Sulzer packing is shown in Table VII below.

TABLE VI

| | 1 | 2 | 3 | 4 | 5 | 6 | 7 |
|---|---|---|---|---|---|---|---|
| Input Conditions | | | | | | | |
| $[Nitrites]FS_i$ (µg/ml) | 6100 | 6100 | 6100 | 4900 | 4900 | 4900 | 4900 |
| $[Acid]_i$ (%) | 2.50 | 2.50 | 2.50 | 2.27 | 2.27 | 2.27 | 2.27 |
| $V_{FS}$ (ml/m.) | 25 | 64 | 70 | 30 | 58 | 64 | 112 |
| $V_G$ (cc/sec) | 78.7 | 78.7 | 78.7 | 78.7 | 78.7 | 78.7 | 78.7 |
| Feed stream temperature, degrees C. | 93 | 92 | 91 | 92 | 92 | 91 | 90 |
| Exit Conditions | | | | | | | |
| $[Acid]_f$ (%) | 1.91 | 1.87 | 1.82 | 1.96 | 1.92 | 2.03 | 1.87 |
| $[Nitrites]_f$ (µg/ml) | 19 | 47 | 65 | 17 | 37 | 42 | 53 |

TABLE VII

|  | 1 | 2 | 3 | 4 | 5 | 6 | 7 |
|---|---|---|---|---|---|---|---|
| Input Conditions | | | | | | | |
| $[Nitrites]_{FS}$ ($\mu$g/ml) | N/A | N/A | N/A | N/A | 12,500 | 12,500 | 12,500 |
| $[Acid]_i$ (%) | 2.05 | 2.05 | 2.05 | 2.05 | 2.15 | 2.15 | 2.15 |
| $V_{FS}$ (ml/m.) | 23 | 51 | 60 | 96 | 32 | 57 | 106 |
| $V_G$ (cc/sec) | 78.7 | 78.7 | 78.7 | 78.7 | 78.7 | 78.7 | 78.7 |
| Feed stream temperature, degrees C. | 91 | 91 | 91 | 92 | 91 | 91 | 91 |
| Exit Conditions | | | | | | | |
| $[Acid]_f$ (%) | 2.00 | 1.75 | 1.77 | 1.72 | 1.88 | 1.78 | 1.73 |
| $[Nitrites]_f$ ($\mu$g/ml) | 13 | 31 | 29 | 52 | 16 | 30 | 65 |

Figure 3:
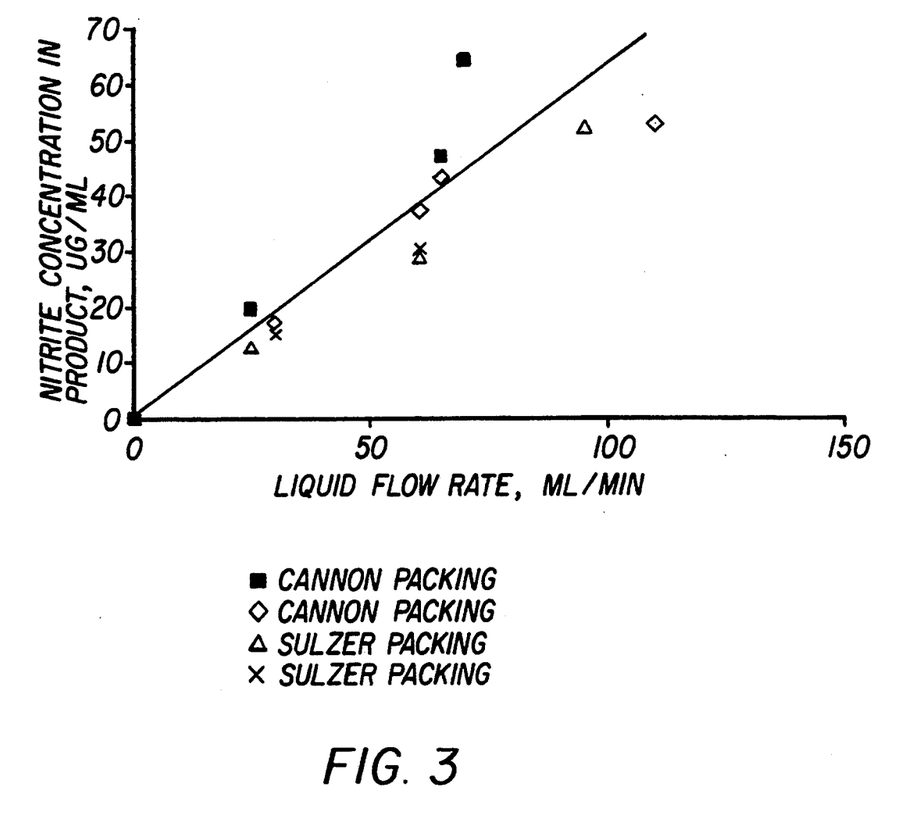
FIG. 3 is a plot of liquid flow rates against nitrite concentration for various packings.

FIG. 3 is a graph of liquid flow rate against nitrite concentration in the product solution. The test results demonstrate good nitrite removal for either Cannon or Koch-Sulzer packing. There is no substantial variation shown by the test results for the two packings, and FIG. 3 shows that the data falls within a statistically reasonable range of a hypothetical straight line result.

EXAMPLE 6

Figure 5:
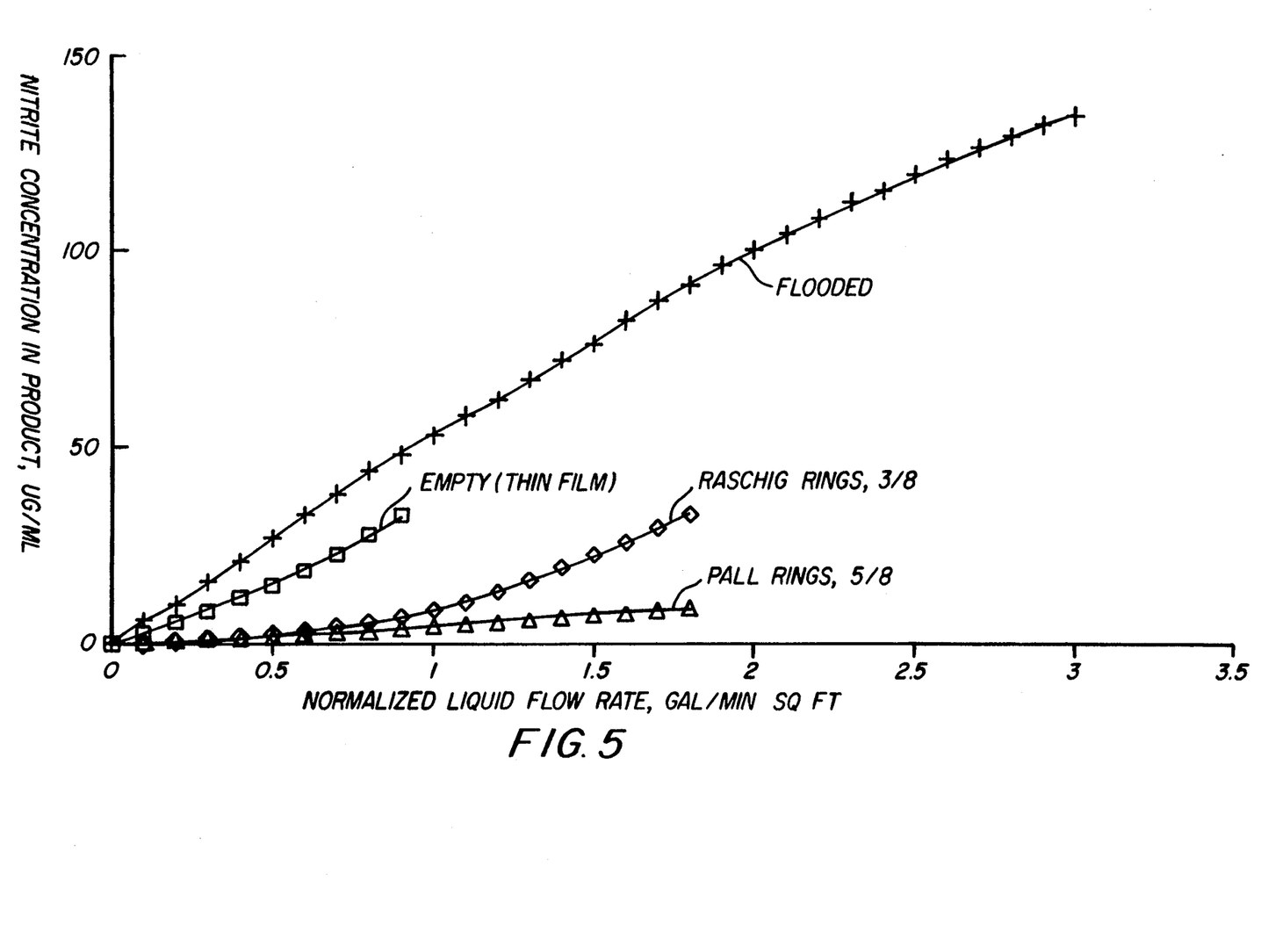
FIG. 5 is a plot of liquid flow rates against nitrite concentration for a thin film reactor and for reactors having the stated packings.

In order to test a thin film reactor in the practice of the invention, the test procedure described above for Examples 1–5 using a steam-jacketed column was followed except that there was no packing in the column. The feed stream was introduced into the glass column at the top and allowed to flow down the inside walls of the column. Air was introduced at the bottom of the column to flow counter to the liquid. Nitrite concentration of liquid exiting the column, i.e. "Product", was measured for different feed stream flow rates, and the results are shown in FIG. 5. FIG. 5 also shows for comparison test results for packed columns. The flooded column data was obtained using a 1 inch diameter, 36 inch long electrically heated column, the liquid flow rate data of which was therefore normalized to a 2 inch diameter, 75 inch column to provide the comparative data points. Initial concentration of nitrites in the feed stream was between 10,000 $\mu$g/ml and 15,000 $\mu$g/ml. The results show that a thin film reactor also provides good decreases in nitrite concentration in the liquid exit stream. Also, thin film reactors are less likely to plug up, require less maintenance than packed columns, and are less expensive than comparably sized packed columns.

EXAMPLE 7

Additional experiments were carried out using a laboratory size packed column reactor at lower silver nitrate as well as nitrite levels. The results are presented as examples of the efficacy of the process of the invention to remove nitrites at very low concentrations.

Essentially the same apparatus was used as for Examples 1 to 6. The laboratory reactor comprised a two-inch diameter, seventy-inch high jacketed glass column packed with ¼ inch Cannon high efficiency packing. The nitrite containing silver nitrate solution was metered using a variable flow plunger pump into an electrically heated preheater and then to the top of the column packing at a rate of 30 ml/min. The aerating air was humidified and preheated and then fed to the bottom of column at a rate of 10 cfh. Temperatures at the top and bottom of the column were measured using thermocouples.

The compositions of the silver nitrate feed solutions were adjusted to the desired levels either by dilution or by mixing different lots of silver nitrate solution. The acid concentrations were adjusted by adding the required amount of nitric acid. The column temperatures were brought up to the required level by passing low pressure steam through the column jacket. The feed streams were then started and allowed to run until steady state temperatures were obtained in the column. The reactor was then run for at least one hour before samples were collected for analysis. Samples of the feed as well as the product silver nitrate streams were collected at the same time and analyzed for nitrites. The silver nitrate concentrations were determined from solution density measurements and acid concentrations. The acid concentrations were obtained by tiltration. Table VIII lists the experimental conditions as well as the results.

TABLE VIII

| Run No. | Column Temp. C. | Silver Nitrate Conc. Wt % | Acid Conc. Wt % | Nitrite Concentration Micrograms/ml | | Amount of Nitrite Removed, % |
|---|---|---|---|---|---|---|
| | | | | IN | OUT | |
| | Low Nitrite | | | | | |
| 1 | 93 | 40 | 1.78 | 270 | 0.813 | 99.72 |
| 2 | 93 | 63 | 6.80 | 151 | 0.443 | 99.73 |
| 3 | 92 | 14 | 2.05 | 52 | 0.419 | 99.22 |
| | Low Nitrate | | | | | |
| 4 | 94 | 26 | 2.06 | 5651 | 0.620 | 99.99 |
| 5 | 93 | 10 | 1.92 | 2714 | 0.349 | 99.99 |
| 6 | 93 | 7 | 1.67 | 2373 | 0.267 | 99.99 |
| 7 | 92 | 5 | 2.10 | 1219 | 0.823 | 99.93 |
| 8 | 92 | 4 | 1.98 | 787 | 0.365 | 99.99 |

It is evident from Table VIII that the concentration of silver nitrate does not affect appreciably the nitrite removal efficiency of the column. It is also shown that nitrites will be reduced to levels below 1.0 micrograms/ml regardless of the initial nitrites concentration.

The data in Tables I to VIII show that the nitrite abatement process of this invention will operate efficiently over a very wide range of feed concentrations of nitrate and nitrite as long as the criteria of temperature, acidity and column conditions are maintained in the manner disclosed in this specification.

With respect to all the above-described Examples, the tests were carried out by introducing an acidified feed stream to the column in a single pass. The invention can also be practiced by staging more than one column in series and collecting product solution from one stage as feed stream for the subsequent stage. Alternatively, some product solution can be removed from the product stream with the remaining product solution recirculated into the nitrite removal column or columns.

As shown by the above examples, in a process of this invention a silver nitrate solution containing nitrite is mixed with nitric acid to form an acidified feed solution. The temperature of the feed solution is established in the range from about 80° C. to about the boiling point of the feed solution and the feed solution is introduced into a packed column. The feed solution is dispersed over the packing while a motive gas is introduced into the column to flow counter to the flow of feed solution through the column. This series of steps, after which product solution is collected, has been unexpectedly found to provide lower-nitrite silver nitrate than do the prior processes known in the art. Exhaust gases containing nitrite, e.g. nitrogen oxides, are removed from the column. The product solution is a low-nitrite silver nitrate solution. In comparison with prior art processes, the process of this invention is highly advantageous. Nitrite concentration in silver nitrate solution typically can be decreased to levels of less than 0.1 $\mu$g/ml (0.1 ppm). Concentrations of nitrites in feed solution as high as 21,000 $\mu$g/ml have been successfully reduced to levels of less than 1.0 $\mu$g/ml. In comparison, disclosed prior art processes decrease nitrite to levels of about 38 ppm.

The process of this invention has advantages over the prior art. The dispersion of the liquid phase over the contacting element, and the intimate contacting of motive gas and liquid maximizing the driving force for mass transfer, provide the advantage of better mass transfer from liquid to gas of such nitrogen oxide gases. The process of the invention does not require a long residence time to achieve a low-nitrite concentration silver nitrate. The invention is advantageous in that, for a given amount of photographic-quality silver nitrate product, the requisite silver inventory is low and the required production equipment smaller compared to that of the prior art, resulting in lower manufacturing costs. The process of the invention produces a product solution having a lower nitrite concentration than those produced by prior art methods.

The invention has been described in detail with particular reference to preferred embodiments thereof, but it will be understood that variations and modifications can be effected within the spirit and scope of the invention.

We claim:

1. A process of treating an aqueous silver nitrate feed solution containing nitrites and nitric acid, the concentration by weight of nitrites in said feed solution being in the range of 52 $\mu$g/ml to 21,000 $\mu$g/ml, the concentration by weight of silver nitrate in said feed solution being in the range of 4.0% to 63.6% and the concentration by weight of nitric acid in said feed solution being in the range from about 0.5% to about the percent at which silver nitrate starts to precipitate from said feed solution, to decrease the nitrite concentration of said feed solution, said process comprising contacting said feed solution, at a temperature in the range of from about 80° C. up to the boiling point of said feed solution, with a counter flow of motive gas in a stripping zone of a vessel having a contacting element therein, such that the flows of said feed solution and said motive gas over said contacting element are sufficient to strip nitrites from said feed solution, and thereby decrease the concentration of nitrites of said feed solution to form a low-nitrite product solution, the concentration by weight of nitrites in said product solution being as low as 0.1 $\mu$g/ml; and subsequently recovering said product solution from said vessel.

2. The process of claim 1, wherein said temperature of said feed solution is in the range of from about 90° C. up to the boiling point of said feed solution.

3. The process of claim 1, wherein said motive gas is air.

4. The process of claim 1, wherein the ratio of the mass flow rate of said feed solution to the mass flow rate of said motive gas is in the range of from about 10 to about 60.

5. The process of claim 1, wherein the temperature of said stripping zone is in the range of from about 80° C. up to the boiling point of said feed solution.

6. The process of claim 1, wherein:
said vessel is a column wherein said stripping zone comprises a packed section and said contacting element comprises a packing;
said feed solution is introduced into said column at a location upstream of said packed section; and
said gas is introduced into said column at a location downstream of said packed section.

7. The process of claim 6, wherein said packing has a surface to volume ratio in the range of from about 100 m$^2$/m$^3$ to about 800 m$^2$/m$^3$.

8. The process of claim 6, wherein the flow rate of said feed solution is not below the wetting point of said contacting element, and the ratio of the mass flow rate of said feed solution to the mass flow rate of said motive gas is not above the ratio of the mass flow rate of said feed solution to the mass flow rate of said motive gas at about the flooding point of said contacting element.

9. The process of claim 1, wherein the weight of said nitric acid to said feed solution is in the range of from about 1 percent to about 2 percent.

10. The process of claim 1, wherein the nitrite concentration of said feed solution is in the range of from about 7300 $\mu$g/ml to about 9400 $\mu$g/ml and the nitrite concentration of said product solution is in the range of from about 0.4 $\mu$g/ml to about 13 $\mu$g/ml.

11. The process of claim 1, wherein the vessel is a thin film reactor.

12. A process of treating an initial aqueous silver nitrate solution containing nitrites to decrease the concentration of said nitrites in said initial solution, said process comprising the steps of:
contacting said initial solution with nitric acid to form a feed solution containing nitrites and nitric acid, the concentration by weight of nitrites in said feed solution being in the range of 52 $\mu$g/ml to 21,000 $\mu$g/ml, the concentration by weight of silver nitrate in said feed solution being in the range of 4.0% to 63.6% and the concentration by weight of nitric acid in said feed solution being in the range from about 0.5% to about the percent at which silver nitrate starts to precipitate from said feed solution;
establishing the temperature of said feed solution in the range of from about 80° C. up to the boiling point of said feed solution;
introducing said feed solution into a vessel, said vessel having a stripping zone containing a contacting element therein, at a first location upstream of said stripping zone;
introducing a counter flow of motive gas into said vessel downstream of said first location at a second location so located that said motive gas can contact at least some of the feed solution in the stripping zone as said motive gas flows through said vessel;

dispersing said feed solution over said contacting element and permitting said feed solution to intimately contact said gas to thereby strip nitrites from said feed solution to form a low-nitrite product solution, the concentration by weight of nitrites in said product solution being as low as 0.1 µg/ml;

removing exhaust gases from said vessel; and collecting said product solution from said vessel.

13. The process of claim 12, wherein said temperature of said feed solution is in the range of from about 90° C. up to the boiling point of said feed solution.

14. The process of claim 12, wherein said motive gas is air.

15. The process of claim 12, wherein the ratio of the mass flow rate of said feed solution to the mass flow rate of said motive gas is in the range of from about 10 to about 60.

16. The process of claim 12, wherein the temperature of said stripping zone is in the range of from about 80° C. up to the boiling point of said feed solution.

17. The process of claim 12, wherein:

said vessel is a column wherein said stripping zone comprises a packed section and said contacting element comprises a packing;

said feed solution is introduced into said column at a location upstream of said packed section; and said gas is introduced into said column at a location downstream of said packed section.

18. The process of claim 17, wherein said packing has a surface to volume ratio in the range of from about 100 $m^2/m^3$ to about 800 $m^2/m^3$.

19. The process of claim 17, wherein the flow rate of said feed solution is not below the wetting point of said contacting element and the ratio of the mass flow rate of said feed solution to the mass flow rate of said motive gas is not above the ratio of the mass flow rate of said feed solution to the mass flow rate of said motive gas at about the flooding point of said contacting element.

20. The process of claim 12, wherein the concentration by weight of said nitric acid to said feed solution is in the range of from about 1 percent to about 2 percent.

21. The process of claim 12, wherein the nitrite concentration of said initial solution is in the range of from about 7300 µg/ml to about 9400 µg/ml and the nitrite concentration of said product solution is in the range of from about 0.4 µg/ml to about 13 µg/ml.

22. The process of claim 12, wherein the vessel is a thin film reactor.

* * * * *